(12) United States Patent
Sugano et al.

(10) Patent No.: US 8,493,186 B2
(45) Date of Patent: Jul. 23, 2013

(54) READING DEVICE, COMPUTER PROGRAM PRODUCT AND READING SYSTEM

(75) Inventors: Hiroyasu Sugano, Kawasaki (JP);
Kazuki Matsui, Kawasaki (JP); Hideto Kihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 771 days.

(21) Appl. No.: 12/382,862

(22) Filed: Mar. 25, 2009

(65) Prior Publication Data

US 2009/0243809 A1    Oct. 1, 2009

(30) Foreign Application Priority Data

Mar. 26, 2008 (JP) ................... 2008-081235
Mar. 18, 2009 (JP) ................... 2009-066054

(51) Int. Cl.
*H04Q 5/22* (2006.01)

(52) U.S. Cl.
USPC ........ 340/10.2; 340/10.1; 340/10.3; 340/10.4

(58) Field of Classification Search
USPC ............................... 340/10.1–10.4
See application file for complete search history.

(56) References Cited

U.S. PATENT DOCUMENTS

| | | | | |
|---|---|---|---|---|
| 4,864,158 A * | 9/1989 | Koelle et al. | ..................... | 327/31 |
| 6,650,228 B1 * | 11/2003 | Vacherand et al. | ........ | 340/10.33 |
| 7,091,864 B2 * | 8/2006 | Veitch et al. | ............... | 340/572.8 |
| 7,290,717 B2 * | 11/2007 | Schuessler | .................... | 235/492 |
| 7,295,114 B1 * | 11/2007 | Drzaic et al. | .............. | 340/572.1 |
| 7,453,347 B1 * | 11/2008 | Bogat | .......................... | 340/10.1 |
| 7,575,176 B2 * | 8/2009 | Sugano et al. | ................ | 235/492 |
| 7,669,767 B2 * | 3/2010 | Sugano et al. | ................ | 235/451 |
| 7,728,714 B2 * | 6/2010 | Koo et al. | ..................... | 340/10.4 |
| 7,768,402 B2 * | 8/2010 | Chen et al. | ................. | 340/572.1 |
| 8,279,047 B2 * | 10/2012 | Carrender et al. | ........... | 340/10.4 |
| 2003/0020598 A1 | 1/2003 | Albert et al. | | |
| 2006/0022800 A1 | 2/2006 | Krishna et al. | | |
| 2006/0022801 A1 * | 2/2006 | Husak et al. | ................ | 340/10.5 |
| 2006/0022815 A1 | 2/2006 | Fischer et al. | | |
| 2006/0170565 A1 | 8/2006 | Husak et al. | | |

FOREIGN PATENT DOCUMENTS

| | | |
|---|---|---|
| EP | 0 638 871 A2 | 2/1995 |
| EP | 0 706 144 A2 | 4/1996 |
| EP | 1 107 162 A1 | 6/2001 |

(Continued)

OTHER PUBLICATIONS

European Search Report mailed Jul. 15, 2009 and issued in corresponding European Patent Application 09156210.8.

(Continued)

*Primary Examiner* — Daniel Wu
*Assistant Examiner* — Mohamed Barakat
(74) *Attorney, Agent, or Firm* — Staas & Halsey LLP

(57) ABSTRACT

The reader/writer repeatedly reads data, which is stored in an IC tag existing in an area where communication with the reader/writer can be established, from the IC tag in a noncontact method. The reader/writer transmits the read data to the administrative device. The administrative device generates read data which shows the result of reading in chronologic order and generates feature data indicative of the feature of the result of reading on the basis of the generated time series data. An IC tag is sorted as a target tag or an unnecessary tag by sorting the read data as necessary data or unnecessary data on the basis of the generated feature data.

10 Claims, 17 Drawing Sheets

FOREIGN PATENT DOCUMENTS

| | | |
|---|---|---|
| JP | 8194011 | 7/1996 |
| JP | 2002-099383 | 4/2002 |
| JP | 2005-108112 | 4/2005 |
| JP | 2005-175681 | 6/2005 |
| JP | 2005-275960 | 10/2005 |
| JP | 2006-071466 | 3/2006 |
| JP | 2006-72672 | 3/2006 |
| JP | 2006-087821 | 4/2006 |
| JP | 2006-313530 | 11/2006 |
| JP | 2006-345890 | 12/2006 |
| WO | 2006/015349 A2 | 2/2006 |

OTHER PUBLICATIONS

Japanese Office Action mailed Jan. 15, 2013, issued in corresponding Japanese Patent Application No. 2009-066054.

* cited by examiner

FIG.4

| COMMAND ISSUING UMBER | | 1 | 2 | 3 | 4 | 5 | 6 | 7 | 8 | 9 | 10 | 11 | 12 |
|---|---|---|---|---|---|---|---|---|---|---|---|---|---|
| READING RESULT | ID1 | 1 | 1 | 0 | 1 | 1 | 1 | 1 | 0 | 0 | 1 | 1 | 0 |
| | ID2 | 1 | 1 | 1 | 1 | 1 | 0 | 1 | 1 | 1 | 1 | 0 | 0 |
| | ID3 | 1 | 1 | 0 | 0 | 1 | 1 | 1 | 0 | 0 | 1 | 0 | 0 |

FIG. 5

| No | ID | BLOCK NUMBER | MAXIMUM CONTINUOUS READING NUMBER | CONTINUOUS READING RATIO |
|---|---|---|---|---|
| 1 | ID1 | 2 | 7 | 0.7 |
| 2 | ID2 | 1 | 10 | 1 |
| 3 | ID3 | 3 | 3 | 0.3 |
| ⋮ | ⋮ | ⋮ | ⋮ | ⋮ |
| N | IDn | 2 | 3 | 0.3 |

FIG. 6

| SMOOTHING PARAMETER | | 1 |
|---|---|---|
| CONTINUOUS READING RATIO | | |
| | LOWER LIMIT VALUE | 0.7 |
| | UPPER LIMIT VALUE | 1 |
| UPPER LIMIT VALUE OF BLOCK NUMBER | | 4 |

FIG. 13

| COMMAND ISSUING NUMBER | | 1 | 2 | 3 | 4 | 5 | 6 | 7 | 8 | 9 | 10 | 11 | 12 |
|---|---|---|---|---|---|---|---|---|---|---|---|---|---|
| READING RESULT | ID1 | 1 | 1 | 1 | 1 | 1 | 1 | 1 | 1 | 1 | 1 | 1 | 1 |
| | ID2 | 1 | 1 | 1 | 1 | 1 | 1 | 1 | 1 | 1 | 1 | 1 | 1 |
| | ID3 | 1 | 1 | 1 | 1 | 1 | 1 | 1 | 1 | 1 | 1 | 1 | 1 |
| | ID4 | 1 | 1 | 0 | 0 | 0 | 0 | 1 | 1 | 1 | 1 | 1 | 0 |
| | ID5 | 1 | 1 | 1 | 1 | 1 | 1 | 1 | 1 | 1 | 1 | 1 | 1 |
| | ID6 | 1 | 1 | 0 | 0 | 0 | 0 | 0 | 1 | 1 | 1 | 0 | 0 |
| | ID7 | 1 | 1 | 1 | 1 | 1 | 1 | 1 | 1 | 1 | 1 | 1 | 1 |
| | ID8 | 1 | 1 | 1 | 1 | 1 | 1 | 1 | 1 | 1 | 1 | 1 | 1 |

READING DEVICE, COMPUTER PROGRAM PRODUCT AND READING SYSTEM

CROSS-REFERENCE TO RELATED APPLICATIONS

This application is based upon and claims the benefit of priority of the prior Japanese Patent Application No. 2008-081235, filed on Mar. 26, 2008, and the prior Japanese Patent Application No. 2009-66054, filed on Mar. 18, 2009, the entire contents of which are incorporated herein by reference.

FIELD

The present invention relates to: a reading device; a computer program product for realizing the operation of the reading device by a computer; and a reading system.

BACKGROUND

Radio Frequency Identification (RFID) is a technology of using radio communication for exchanging information stored in a tag. The RFID technology includes two distinct types: an active type wherein a tag has a built-in battery and power for the operation is supplied internally; and a passive type wherein a tag does not have a built-in battery and operates using power which is supplied by a high frequency wave transmitted from a reader/writer device. The passive type tags can be offered at a relatively lower price than the active type tags and are expected to be useful in a variety of areas including the field of physical distribution. When the UHF band (860 to 960 MHz) is used as the frequency band of RFID, the radio communication area becomes wider than the other frequency band even for the passive type, so that a plurality of tags can be read at once. Accordingly, it becomes possible to read a plurality of tags attached to a number of articles at one time for inspection in the field of physical distribution, for example.

However, as a result of broadening the communication area, the UHF band RFID has an inherent problem that a tag is sometimes read unintendedly. For example, at the time of shipping inspection at a warehouse or the like, a tag attached to an article placed at a position which is so far from an inspection gate that the tag is normally not read is accidentally read by a radio wave reflected at a forklift which passes close to the article. When a plurality of gates are placed side by side, there is another problem that a tag of an article which comes in an adjacent gate is read.

In such a case, an unnecessary tag can be sometimes eliminated by filtering based on an ID stored in a tag. For example, when an ID is composed of some element including logistics types (e.g., pallet or individual) of an article or the like, a tag ID indicative of a pallet tag can be eliminated by knowing type data indicative of the type of an article in advance. Moreover, when unintended tag reading is caused by reflection of a radio wave or the like, there is a known method for periodically executing a plurality of times of detection for a tag attached to an article and eliminating an ID of a tag which is not detected continuously over a predetermined number of times, assuming that the tag was read accidently by reflection (see Patent Document 1: Japanese Patent Application Laid-Open No. 2005-275960).

However, when a target tag and an unnecessary tag belong to the same type of an article, judgment by type data included in a layered ID cannot be used. Moreover, filtering using only continuous detection such as Patent Document 1 can be performed only in extremely limited instances. Although there is another commonly-used measure of physically isolating a reading area with a radio wave adsorption board or the like to eliminate unintended tag reading, this method has a problem that the man-hour of field operation of installation increases drastically. Furthermore, although there is another method of using a phased-array antenna or the like which can change the antenna directivity thereof to find a tag which is actually out of a reading area and identify the tag as an unnecessary tag, a new problem arises that a reading device becomes expensive.

SUMMARY

Accordingly, it is an object of the embodiment to provide a reading device which can employ only necessary data even when unnecessary data is read at the same time.

According to an aspect of the embodiment, an apparatus includes a reading device for repeatedly reading data, which is stored in a recording medium existing in an area where communication with the reading device can be established, in a noncontact method, performing the operations of: generating time series data which shows a result of reading in chronologic order; generating feature data which shows the result of reading based on the generated time series data; and sorting read data as necessary data or unnecessary data based on the generated feature data.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 4 is a schematic view for explaining read data;

FIG. 5 is a schematic view for explaining feature data;

FIG. 6 is a schematic view for explaining reference data;

FIG. 13 is a schematic view for showing read data obtained when the output level of a radio signal is changed;

DESCRIPTION OF EMBODIMENTS (Embodiment 1)

Figure 1:
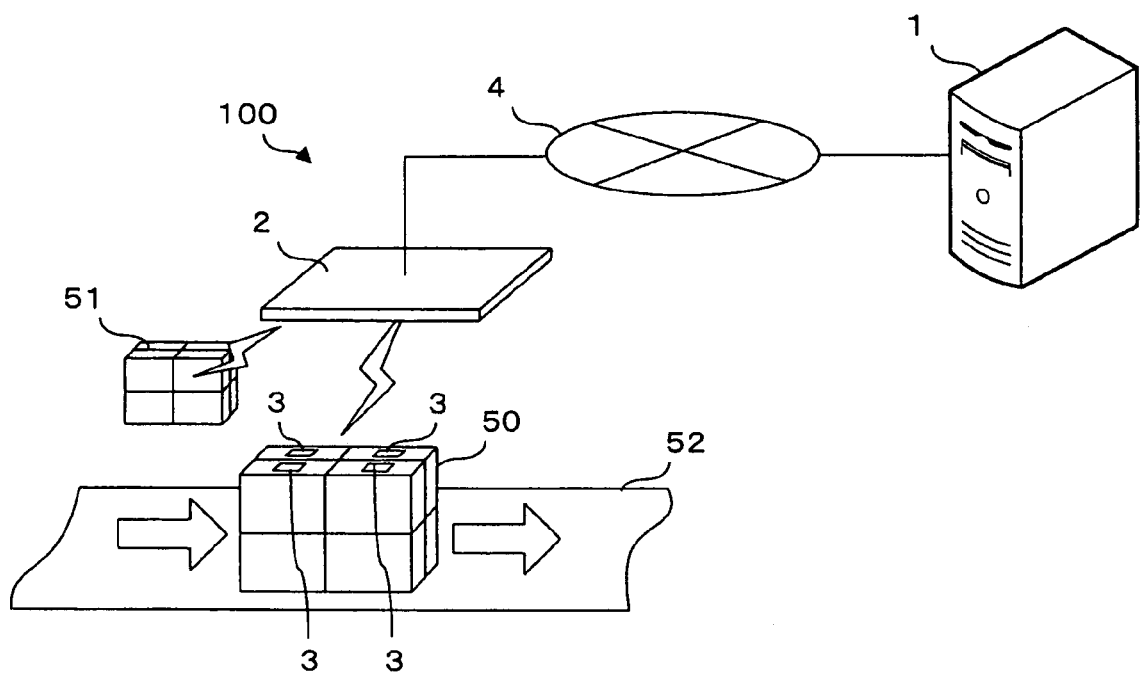
FIG. 1 is a schematic view for showing an example of the structure of a reading system according to Embodiment 1.

FIG. 1 is a schematic view for showing an example of the structure of a reading system according to Embodiment 1. A reading system 100 according to Embodiment 1 is used for managing manufacturing, physical distribution or inventory. The reading system 100 according to Embodiment 1 comprises: an administrative device (reading device) 1 which is connected with a wired or wireless network such as a Local Area Network (LAN) set up in, for example, a warehouse; a reader/writer (reading device) 2; and IC tags (recording media) 3. It should be noted that the reader/writer 2 may be a read-only reader.

Each IC tag 3 comprises an IC chip for storing data and an antenna which enables radio communication, and is attached to an article 50 which is conveyed along a path 52 by, for example, a forklift or a belt conveyor (not illustrated). The IC chip in the IC tag 3 stores unique identification data (hereinafter referred to as Identifier (ID)) for identifying an article having the IC tag 3 attached thereto. Article data (e.g., type and manufacturing date) relating to an article or the like may also be stored. The IC tag 3 according to Embodiment 1 is a passive type tag without a built-in battery using a radio wave method which uses a communication frequency band of, for example, 860 to 960 MHz, and generates a current when receiving a high frequency wave (including request signal) transmitted from an antenna of the reader/writer 2. The generated current is rectified and then supplied to the respective parts of the IC tag 3 as adjusted supply voltage, so that the IC tag 3 becomes operable.

In order to transmit and receive data between the reader/writer 2 and the IC tag 3, the reader/writer 2 first conducts a search (inventory) for an IC tag 3 which exists in an area where communication with the antenna can be established. When receiving a search command transmitted from the reader/writer 2, the IC tag 3 becomes operable with voltage being supplied to the respective parts and then transmits its own ID to the reader/writer 2 as a response to the search command. In such a manner, the reader/writer 2 can identify the ID of the IC tag 3, enabling transmission and reception of data between the reader/writer 2 and the IC tag 3.

If a plurality of IC tags 3 exist in a communication range of the antenna when a search command is transmitted by the reader/writer 2, a plurality of IC tags simultaneously transmit responses to the search command, causing a collision state where the responses interfere mutually and the reader/writer 2 cannot receive the responses. In order to avoid such a state, various collision arbitration function has been investigated and implemented on the reader/writer 2 and the IC tag 3.

The reader/writer 2 is placed above the path 52 so that an article 50 having IC tags 3 attached thereto passes under the reader/writer 2. When the article 50 passes under the reader/writer 2, the reader/writer 2 transmits a search command and receives the ID of an IC tags 3 attached to the article 50, and then reads or writes data as needed.

In particular, when a sensor (not illustrated) connected to the administrative device 1 detects the article 50 passing under the reader/writer 2, the reader/writer 2 receives an instruction command from the administrative device 1. An instruction command includes a write instruction command for executing writing of data in the IC tag 3, a read instruction command for executing reading of data from the IC tag 3, and the like.

When receiving a read instruction command, the reader/writer 2 transmits a search command included in a high frequency wave and the IC tag 3 which has received the search command sends out a stored ID after a necessary collision arbitration operation. When the IC tag 3 contains article data described above besides an ID, a data read command or a data write command may further be transmitted and received between the reader/writer 2 and the IC tag 3, so that information relating to the article 50 which passes under the reader/writer 2 is obtained and data is written. The reader/writer 2 transmits the obtained information to the administrative device 1 via a network 4.

By receiving a radio signal from the reader/writer 2, the IC tag 3 is supplied with power and becomes able to respond to the respective commands. Accordingly, when an IC tag 3 does not exist in a communication range of the antenna of the reader/writer 2, i.e., an area where a sufficiently strong radio signal from the reader/writer 2 can be received by an IC tag 3, the reader/writer 2 cannot read data of an IC tag 3.

The reader/writer 2 according to Embodiment 1 repeatedly sends out a search command according to a specified condition. Here, the search command may be sent out according to an instruction command from the administrative device 1 of each time or may be sent out autonomously according to a condition which is preset to the reader/writer 2. The IC tag 3 then sends out data stored therein every time a search command is received (after a collision arbitration operation). Accordingly, the reader/writer 2 is to receive data corresponding to the number of times a search command is sent out, as long as an IC tag 3 responds every time and the radio wave environment has no problem. Here, the reader/writer 2 may read the IC tag 3 from an upper side of a conveyed article 50 as shown in FIG. 1 or from a lateral side of the article 50. Moreover, a plurality of articles 50 may be conveyed in clusters or only one article 50 may be conveyed.

The administrative device 1 is connected with a plurality of reader/writers 2 via the network 4. The administrative device 1 transmits instruction commands such as a read instruction command and a write instruction command to a reader/writer 2. The administrative device 1 also receives data which is read from an IC tag 3 by a reader/writer 2.

When receiving data from a reader/writer 2, the administrative device 1 sorts the IC tag 3, from which the reader/writer 2 has read data, as a target tag or an unnecessary tag. A target tag means an IC tag 3 which is to be read by the reader/writer 2, i.e., an IC tag 3 attached to an article 50 which passes under the reader/writer 2. An unnecessary tag means an IC tag 3 which is unintentionally read by the reader/writer 2, i.e., an IC tag 3 attached to an article 51 which does not pass under the reader/writer 2. A radio signal to read data from the IC tag 3 sent out by the reader/writer 2 is sometimes received by an IC tag 3 attached to an article 51 other than an article 50 which passes under the reader/writer 2, due to the influence of reflection or the like. Accordingly, the reader/writer 2 sometimes receives data of an IC tag 3 attached to an article 51 which is not a target of reading. Accordingly, the administrative device 1 sorts the IC tag 3, from which the reader/writer 2 has read data, as a target tag or an unnecessary tag. The administrative device 1 then manages data of the article 50 on the basis of the result of sorting. The sorting method will be described later.

Figure 2:
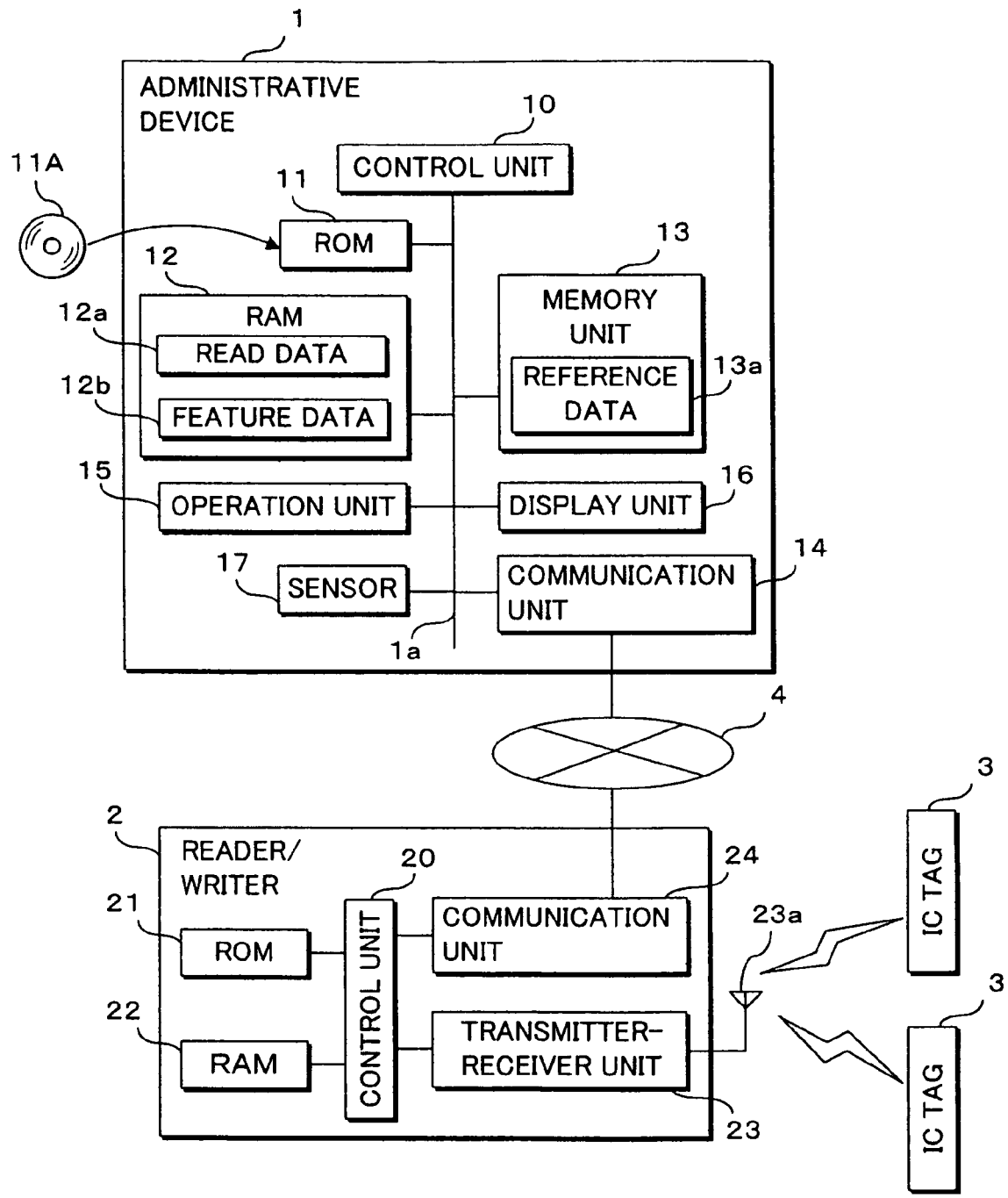
FIG. 2 is a block diagram for showing an example of the structure of an administrative device and a reader/writer.

FIG. 2 is a block diagram for showing an example of the structure of the administrative device 1 and the reader/writer 2.

The administrative device 1 according to Embodiment 1 comprises a control unit 10, a Read Only Memory (ROM) 11, a Random Access Memory (RAM) 12, a memory unit 13, a communication unit 14, an operation unit 15, a display unit 16 and a sensor 17. These respective hardware units are interconnected via a bus 1a.

The control unit 10 has a Central Processing Unit (CPU), a Micro Processor Unit (MPU) or the like. The control unit 10 reads out a control program which is prestored in the ROM 11 or the memory unit 13 arbitrarily to the RAM 12 according to predetermined timing, executes the read control program and controls the operation of the respective hardware units described above. The ROM 11 prestores a variety of control programs necessary for causing the administrative device 1 to operate. The RAM 12 is constituted of a Static RAM (SRAM), a flash memory or the like, and temporarily stores a variety of data to be generated in execution of the control programs by the control unit 10. For example, read data (time series data) 12a and feature data 12b are stored.

The communication unit 14 enables data communication with the reader/writer 2 via the network 4. The communication unit 14 transmits an instruction command to the reader/writer 2 and receives data of the IC tag 3 from the reader/writer 2. The operation unit 15 is provided with a variety of input device like a keyboard, a mouse or the like necessary for the manager to operate the administrative device 1. When the manager operates each input device, the operation unit 15 sends a control signal corresponding to the input to the control unit 10, so that the control unit 10 executes a process corresponding to the obtained control signal. The display unit 16 is constituted of, for example, a liquid crystal display and displays the operation state of the administrative device 1, information inputted through the operation unit 15, information of which the manager is to be notified, and the like according to an instruction from the control unit 10.

The sensor 17 is an optical sensor, a touch sensor or the like, and detects an article 50 which passes under the reader/writer 2. When the sensor 17 detects an article 50, the administrative device 1 transmits instruction commands such as a read instruction command and a write instruction command to the reader/writer 2.

The memory unit 13 is a nonvolatile storage device such as a hard disk or a flash memory. The memory unit 13 stores a variety of control programs necessary for causing the administrative device 1 to operate, data read by the reader/writer 2, and the like. The memory unit 13 also stores reference data 13a.

FIG. 4 is a schematic view for explaining read data 12a.

The read data 12a associates the number of times a read instruction command is issued by the administrative device 1 with a result showing whether data of the IC tag 3 has been received from the reader/writer 2 or not. As described above, the reader/writer 2 repeatedly sends out a search command according to a specified condition. In this embodiment, each search command is sent once every time the reader/writer 2 receives the read instruction command issued by the administrative device 1. Accordingly, the administrative device 1 sends a read instruction command to the reader/writer 2, and then receives data of an IC tag 3 from the reader/writer 2 and stores the received data in the RAM 12 every time a read instruction command is transmitted. The read data 12a associates an issued read instruction command with a result (reading result) showing whether the administrative device 1 has received data of the IC tag 3 from the reader/writer 2 or not, i.e., whether the reader/writer 2 could read data of the IC tag 3 or not. In FIG. 4, "1" shows a case where data could be read and "0" shows a case where data could not be read. In other embodiment, the reader/writer 2 may send search commands repeatedly in a predetermined manner and then send responses for those search commands at one time to the administrative device 1. In this case, it is preferable that each response from the IC tag 3 contained in the response to the administrative device 1 is associated to the corresponding search command sent from the reader/writer 2.

The administrative device 1 obtains the tag ID when it is read at the first time in the sequence of issued read instruction commands and then generates read data 12a according to each of the obtained ID. That is, in FIG. 4, the reading result does not become "0" for each ID obtained by the read instruction command issued for the first time (the command issuing number is "1"). Although the read data 12a in FIG. 4 associates the number of times a read instruction command is issued with the reading result, data may associate a reading time with a reading result if the time (reading time) when a response is returned from the read instruction command or the search command can be obtained.

FIG. 5 is a schematic view for explaining feature data 12b.

Feature data is generated on the basis of the read data 12a shown in FIG. 4 and is used for sorting the IC tag 3 which the reader/writer 2 has read as a target tag or an unnecessary tag. In the feature data, the maximum continuous reading number, a block number and a continuous reading ratio, which are extracted from the read data 12a, are associated with the ID of data. The maximum continuous reading number means the maximum number among the numbers of times the same ID has been read continuously. The block number means the number of blocks, each of which means a sequence of successful read instruction commands reading the same ID continuously. The continuous reading ratio means a value obtained by dividing the maximum continuous reading number for each ID by the maximum value of the maximum continuous reading number in all read data. Used for deciding the continuous reading number is a smoothing parameter which is a preset value. A smoothing parameter is a threshold for determining that a tag could be read continuously even when a tag could not be read temporarily due to some influence, so that it is considered that a tag is detected continuously when the number of continuous times which has failed to read is smaller than or equal to the smoothing parameter.

For example, regarding the read data 12a according to ID1 in FIG.4, the continuous reading number is obtained assuming that the smoothing parameter is "1". Although the reading result is "0" for the command issuing number "3", the reading result of the command issuing number "3" is ignored since the smoothing parameter is "1". On the other hand, since the reading result "0" continues twice, which exceeds the smoothing parameter "1", for the command issuing numbers "8" and "9", it is determined that the command issuing numbers "1" to "7" could be read continuously in FIG. 4. Similarly, it is determined that the command issuing numbers "10" to "11" could be read. Accordingly, continuous reading numbers "7" and "2" are obtained from the read data 12a shown in FIG. 4 and the maximum reading number becomes "7". The block number becomes "2". The continuous reading ratio, which is a number obtained by dividing the maximum continuous reading number corresponding to each ID by the maximum continuous reading number 10 which is the maximum value in the figure, is computed to be 0.7 for ID1, 1 for ID2, and 0.3 for ID3.

By using a smoothing parameter, it becomes possible to reduce an administration mistake sorting a target tag as unnecessary based on accidental failure of reading IC tag 3. It should be noted that the set value of the smoothing parameter can be changed arbitrarily depending on the reading environment or the like.

FIG. 6 is a schematic view for explaining reference data 13a.

The reference data 13a is data to be a reference for generating the feature data 12b and sorting the generated feature data 12b as necessary data or unnecessary data. Necessary data means feature data generated on the basis of a result of reading of an IC tag 3, which is to be read, by the reader/writer 2. Unnecessary data means feature data generated on the basis of a result of reading of an IC tag 3, which is not to be read, by the reader/writer 2. That is, by sorting the corresponding feature data 12b as necessary data or unnecessary data, it becomes possible to sort an IC tag 3 as a target tag or an unnecessary tag.

Preset as the reference data 13a are a smoothing parameter to be used for generating the feature data 12b, and a lower limit value and an upper limit value of the continuous reading ratio and the upper limit value of the block number to be used for sorting the feature data 12b. For example, in FIG. 6, the smoothing parameter is "1", the lower limit value of the continuous reading ratio is "0.7", the upper limit vale of the continuous reading ratio is "1" and the upper limit value of the block number is "4". When the feature data 12b shown in FIG. 5 is generated using the smoothing parameter "1", determined is whether the continuous reading ratio of the feature data 12b is within the range from "0.7" to "1" and the block number is smaller than or equal to "4" or not. When these conditions are satisfied, the data of the IC tag 3 corresponding to the feature data 12b is sorted as necessary data. On the other hand, when the conditions are not satisfied, the data is sorted as unnecessary data. It is also possible to specify the upper limit value and the lower limit value of the maximum continuous reading number instead of the continuous reading ratio. However, since a continuous reading number may possibly be affected by the traveling speed of the IC tag which travels or by the number of tags to be read simultaneously, more appropriate sorting can be achieved in a method which uses the continuous reading ratio when the traveling speed or the number of tags is not constant.

As shown in FIG. 2, the reader/writer 2 according to Embodiment 1 comprises a control unit 20, a ROM 21, a RAM 22, a transmitter-receiver unit 23 and a communication unit 24.

The control unit 20 has a CPU, an MPU or the like. The control unit 20 reads out a control program which is prestored in the ROM 21 arbitrarily to the RAM 22 according to predetermined timing, executes the read control program and controls the operation of the respective hardware units described above. The ROM 21 prestores a variety of control programs necessary for causing the reader/writer 2 to operate. The RAM 22 is constituted of an SRAM, a flash memory or the like, and temporarily stores a variety of data to be generated in execution of the control programs by the control unit 20.

The transmitter-receiver unit 23 communicates data with an IC tag 3 via an antenna 23a. For example, the transmitter-receiver unit 23 sends out a radio signal of search command by an order of the control unit 20. The transmitter-receiver unit 23 then receives the data sent by the IC tag 3 which has received the radio signal. The received data is processed by the control unit 20 and transmitted from the communication unit 24 to the administrative device 1 via the network 4.

Figure 3:
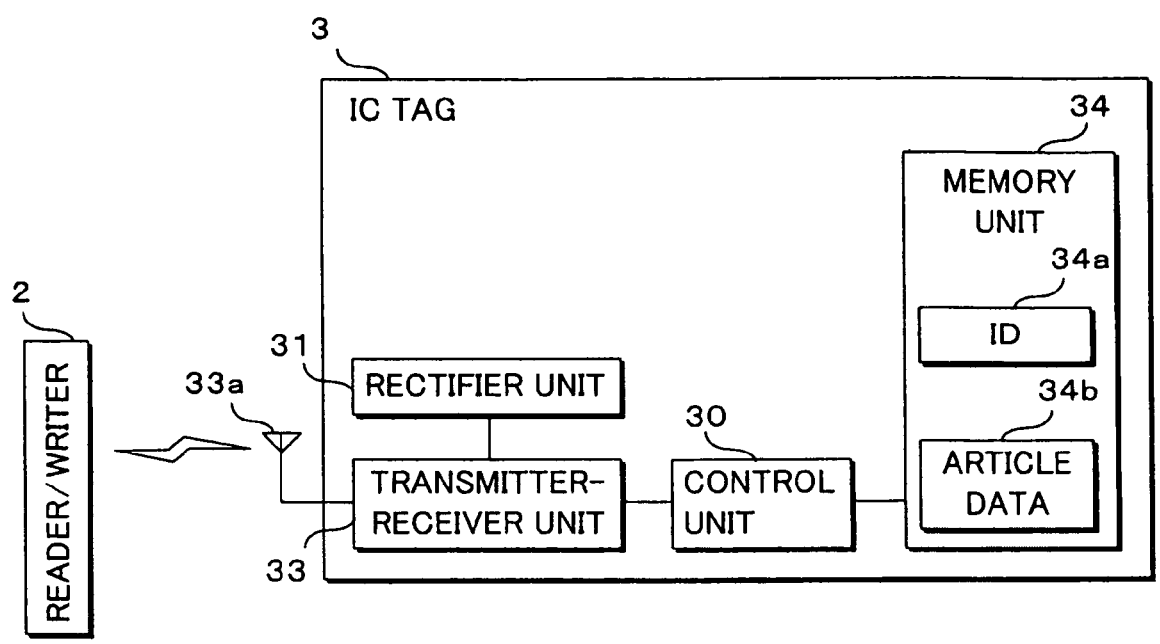
FIG. 3 is a block diagram for showing an example of the structure of an IC tag.

FIG. 3 is a block diagram for showing an example of the structure of an IC tag 3. In this embodiment, an IC tag 3 is a passive type tag.

The IC tag 3 comprises a control unit 30, a rectifier unit 31, a transmitter-receiver unit 33, an antenna 33a and a memory unit 34.

The control unit 30 has a programmable integrated circuit such as an FPGA (Field Programmable Gate Array), an integrated circuit or a large scale integrated circuit (LSI) having operation logic preliminarily incorporated therein, or the like and controls the operation of the IC tag 3 according to control logic which is preprogrammed or preliminarily incorporated.

The transmitter-receiver unit 33 modulates or demodulates each signal so as to transmit and receive a signal to and from the reader/writer 2 via the antenna 33a. A current generated when the antenna 33a receives a high frequency wave is processed with a rectification process by a rectifier unit 31 and then supplied to a control unit or a memory unit as power. In such a manner, the IC tag 3 can be used without having a battery.

The memory unit 34 has a nonvolatile memory such as an FRAM. The memory unit 34 stores IDs 34a allocated respectively to IC tags 3, article data 34b relating to an article having an IC tag 3 attached thereto, and the like.

Figure 7:
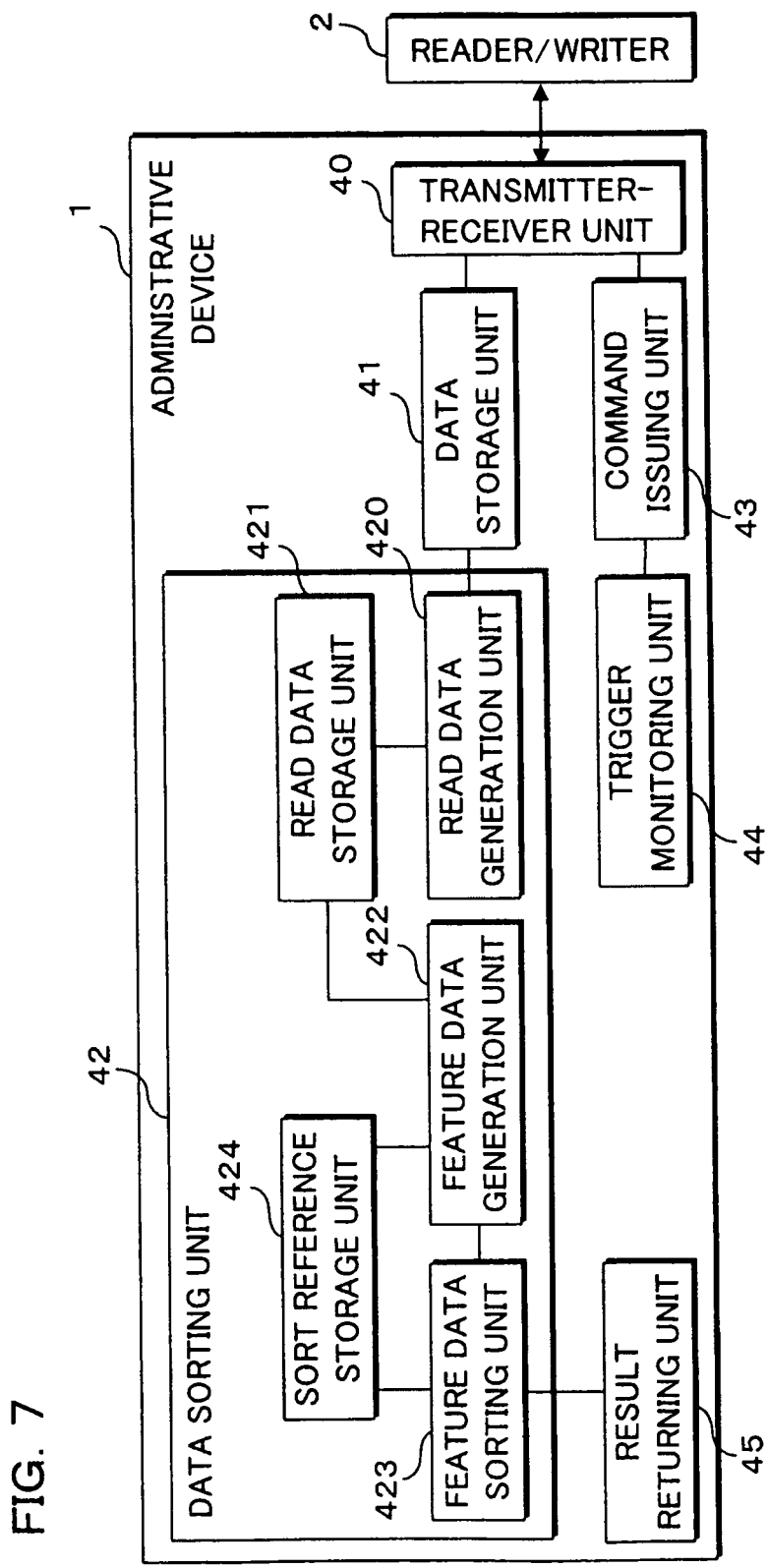
FIG. 7 is a block diagram for showing the function and the structure of an administrative device according to Embodiment 1.

The following description will explain the function of the reading system 100 having the structure described above, which is realized when the control unit 10 of the administrative device 1 executes a control program stored in the ROM 11 or the memory unit 13. FIG. 7 is a block diagram for showing the functional structure of the administrative device 1 according to Embodiment 1.

The administrative device 1 according to Embodiment 1 includes a transmitter-receiver unit 40, a data storage unit 41, a data sorting unit 42, a command issuing unit 43, a trigger monitoring unit 44, a result returning unit 45 and the like. The control unit 10 executes a control program stored in the ROM 11 or the memory unit 13, and then the administrative device 1 obtains the respective functions described above The transmitter-receiver unit 40 transmits and receives data to and from the reader/writer 2. For example, the transmitter-receiver unit 40 transmits an instruction command to the reader/writer 2. The instruction command is issued by the command issuing unit 43. The command issuing unit 43 issues a read command which causes the reader/writer 2 to read the data of an IC tag 3 when, for example, the trigger monitoring unit 44 for monitoring the operation of the sensor 17 detects an article 50.

The transmitter-receiver unit 40 also receives data read by the reader/writer 2 from the reader/writer 2. The data read by the reader/writer 2 is stored in the data storage unit 41. A data storage unit 41 stores an ID 34a included in the data in association with the article data.

The data sorting unit 42 sorts data on the basis of the data stored in the data storage unit 41. The data sorting unit 42 includes a read data generation unit 420, a read data storage unit 421, a feature data generation unit 422, a feature data sorting unit 423, a sort reference storage unit 424 and the like.

The read data generation unit 420 generates read data explained with reference to FIG. 4 from the data stored in the data storage unit 41. The read data storage unit 421 stores the read data generated by the read data generation unit 420.

The sort reference storage unit 424 stores the reference data 13a explained with reference to FIG. 6. The feature data generation unit 422 generates the feature data explained with reference to FIG. 5 on the basis of a smoothing parameter of reference data 13a stored in the sort reference storage unit 424 and read data stored in the read data storage unit 421. The feature data sorting unit 423 then sorts the feature data generated by the feature data generation unit 422 as necessary data or unnecessary data on the basis of reference data 13a stored in the sort reference storage unit 424. The result of sorting by the feature data sorting unit 423 is outputted to the result returning unit 45. When the feature data sorting unit 423 sorts feature data, an IC tag 3 from which the reader/writer 2 has read data can be sorted as a necessary tag or an unnecessary tag.

The following description will explain the operation of the administrative device 1 and the reader/writer 2 of the reading system 100.

Figure 8:
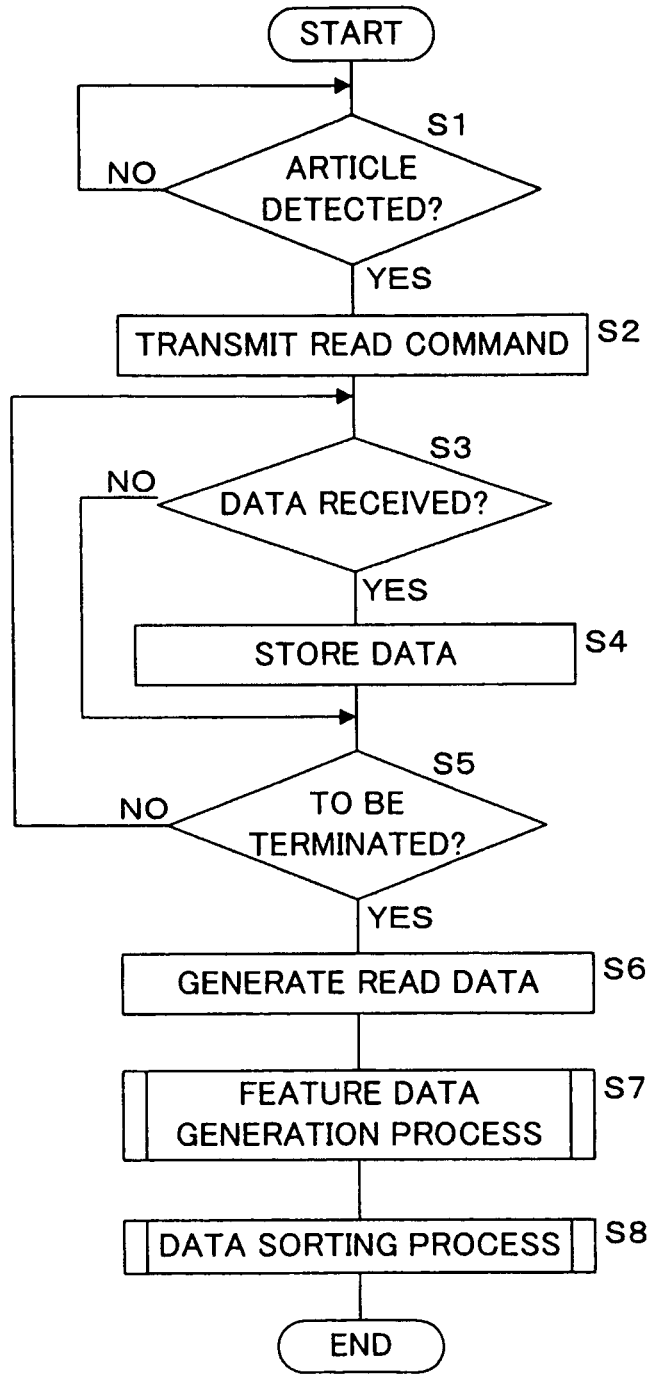
FIG. 8 is a flow chart for showing the process procedure to be performed by the administrative device.

FIG. 8 is a flow chart for showing the process procedure to be performed by the administrative device 1.

The control unit 10 determines whether the sensor 17 has detected an article 50 which passes under the reader/writer 2 or not (S1). When the sensor 17 has not detected an article 50 (S1: NO), the control unit 10 waits until an article 50 is detected. When the sensor 17 has detected an article 50 (S1: YES), the control unit 10 issues a read instruction command and transmits the issued read instruction command to the reader/writer 2 (S2).

The control unit 10 determines whether data of an IC tag 3 has been received from the reader/writer 2 or not (S3). When data has been received from the reader/writer 2 (S3: YES), the control unit 10 stores the received data in the memory unit 13 (S4). It should be noted that the control unit 10 stores the received data for each ID included in the data. The control unit 10 then executes a process of S5. When data has not been received from the reader/writer 2 (S3: NO), the control unit 10 executes the process of S5.

Next, the control unit 10 determines whether the process is to be terminated or not, i.e., whether a reading process is to be continued or not (S5). The control unit 10 determines whether a predetermined time has elapsed after the sensor 17 detected an article 50 or not. When a termination sensor is further provided, whether the reading process is to be terminated or continued may also be determined on the basis of whether the termination sensor has detected an article 50 or not.

When the process is not to be terminated (S5: NO), i.e., when a reading process is to be continued, the control unit 10 repeatedly executes the process after S2 until a predetermined time elapses. When the process is to be terminated (S5: YES), the control unit 10 generates read data from data stored in the memory unit 13 (S6). The control unit 10 executes a process for generating feature data 12b on the basis of the generated read data (S7). The control unit 10 executes a process for sorting data on the basis of the generated feature data 12b (S8). The control unit 10 then terminates the present operation. The feature data generation process of S7 and the data sorting process of S8 will be described later.

Figure 9A:
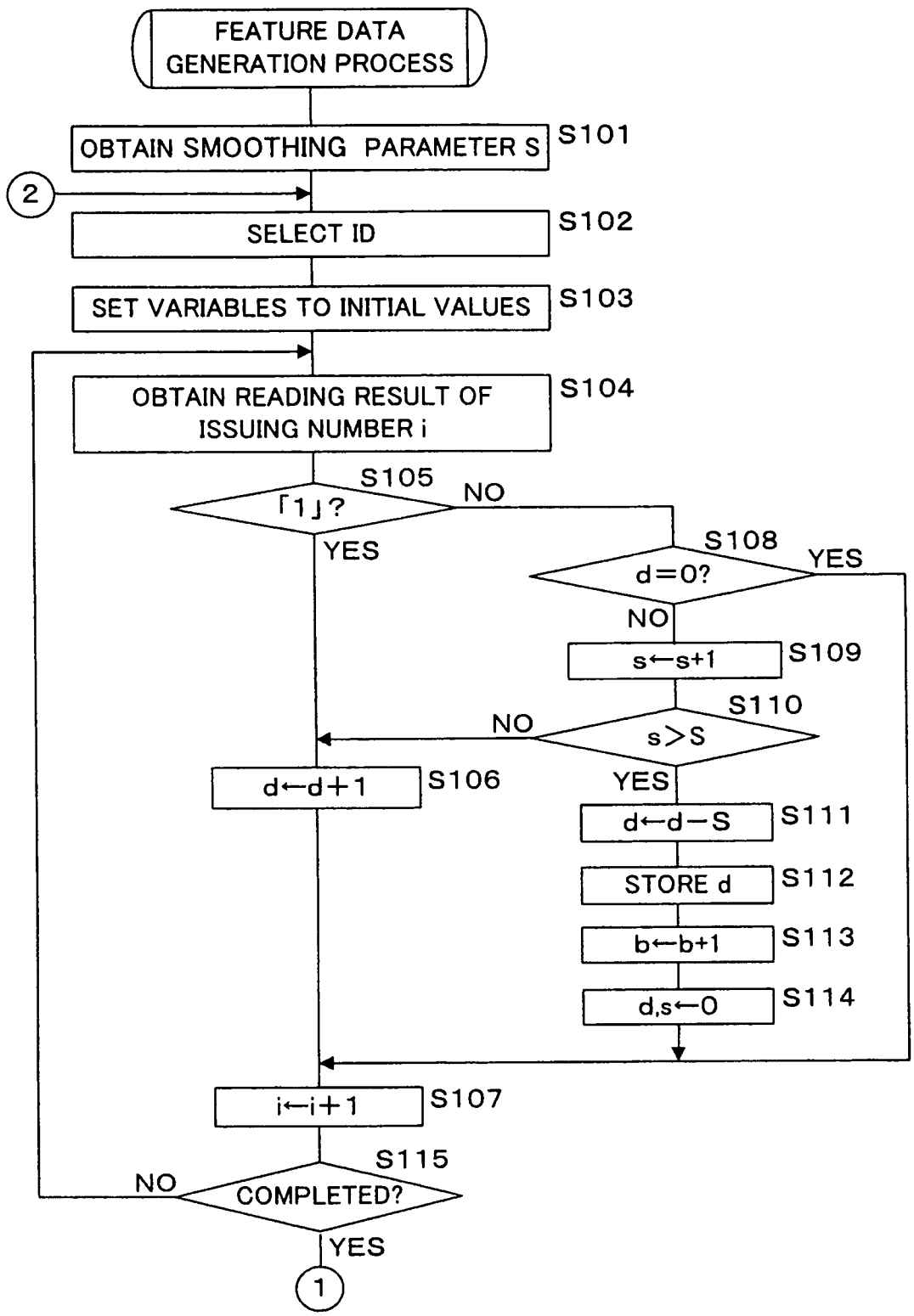
FIGS. 9A and 9B are a flow chart for showing the process procedure of a feature data generation process.
Figure 9B:
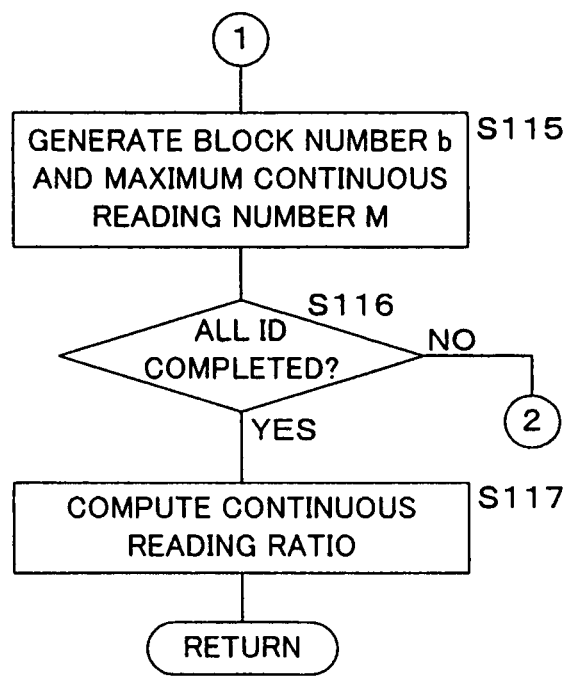

FIGS. 9A and 9B are a flow chart for showing the process procedure of a feature data generation process.

The control unit 10 obtains reference data 13a from the memory unit 13 and obtains a smoothing parameter S included in the reference data 13a (S101). The control unit 10 selects an ID from the ID list of the read data 12a, which has been generated for each ID, and the feature data 12b is extracted for each (S102).

The control unit 10 sets variables to initial values (S103). The variables include a continuous reading number d, a block number b, a smoothing checker s, an issuing number i and the like. The continuous reading number d, the block number b and the smoothing checker s are set to initial values "0". The issuing number i is set to an initial value "1". A continuous reading number d means the number of times data of an IC tag 3 is read continuously by the reader/writer 2, i.e., the number of continuous "1" in the read data in FIG. 4. A smoothing checker s means a value used for determining to regard a failure read as a successful read, by comparing the checker s with the smoothing parameter S. An issuing number i means the number of times the administrative device 1 has issued a read command.

The control unit 10 obtains the reading result corresponding to the issuing number i from the read data 12a of an ID selected in S102 (S104) and checks whether the reading result is "1" or not (S105). When the reading result is "1" (S105: YES), i.e., when the reader/writer 2 could read data of an IC tag 3 in the timing of the issuing number i, the control unit 10 adds "1" to the continuous reading number d (S106). The control unit 10 then adds "1" to the issuing number i (S107) and performs a process for the next issuing number.

When the reading result corresponding to the issuing number i is not "1" (S105: NO), i.e., when the reader/writer 2 could not read data of an IC tag 3 in the timing of the issuing number i, the control unit 10 determines whether the continuous reading number d is "0" or not (S108). When the continuous reading number d is "0" (S108: YES), the control unit 10 adds "1" to the issuing number i (S107) and performs a process for the next issuing number. When the continuous reading number d is not "0" (S 108: NO), the control unit 10 adds "1" to the smoothing checker s (S109). The control unit 10 then determines whether the result of addition exceeds the smoothing parameter S or not (S110). When the result of addition does not exceed the smoothing parameter S (S110: NO), the control unit 10 executes a process after S106. That is, although the reading result corresponding to the issuing number i is "0", the control unit 10 determines that data could not be read accidentally and adds "1" to the continuous reading number d as a dummy value (S106).

When the result of addition exceeds the smoothing parameter S (S110: YES), the control unit 10 assumes that continuous reading has ended, subtracts the smoothing parameter S from the continuous reading number d so as to reduce the number of times which has been obtained temporarily by addition (S111) and stores the value of the continuous reading number d in the RAM 12 or the like (S112). The control unit 10 further adds "1" to the block number b (S113). The control unit 10 then sets the continuous reading number d and the smoothing checker s back to initial values "0" (S114) and executes a process after S107.

In S107, the control unit 10 adds "1" to the issuing number i (S107) and determines whether the process from S104 to S114 for all issuing timing has been completed or not (S115). For example, in the case of reading data in FIG. 4, the control unit 10 determines whether the issuing number i exceeds "12" or not. When the process has not been completed (S115: NO), the control unit 10 executes the process after S104 again. When the process has been completed (S115: YES), the control unit 10 generates a block number b, and the maximum value (maximum continuous reading number) M from the continuous reading numbers d stored in the RAM 12 (S116). The control unit 10 then determines whether block numbers and maximum continuous reading numbers M have been generated for all IDs in read data or not (S117). When block numbers and maximum continuous reading numbers M have not been generated for all IDs (S117: NO), the control unit 10 executes the process after S102 and generates a block number and the maximum continuous reading number M for the remaining ID. When block numbers and maximum continuous reading numbers M have been generated for all IDs (S117: YES), the control unit 10 is selects the maximum value from the maximum continuous reading numbers M and divides the maximum continuous reading numbers corresponding to the respective IDs by the selected value so as to compute the continuous reading ratio for each ID (S118). The control unit 10 then terminates the present operation and executes S8 in FIG. 8.

Figure 10:
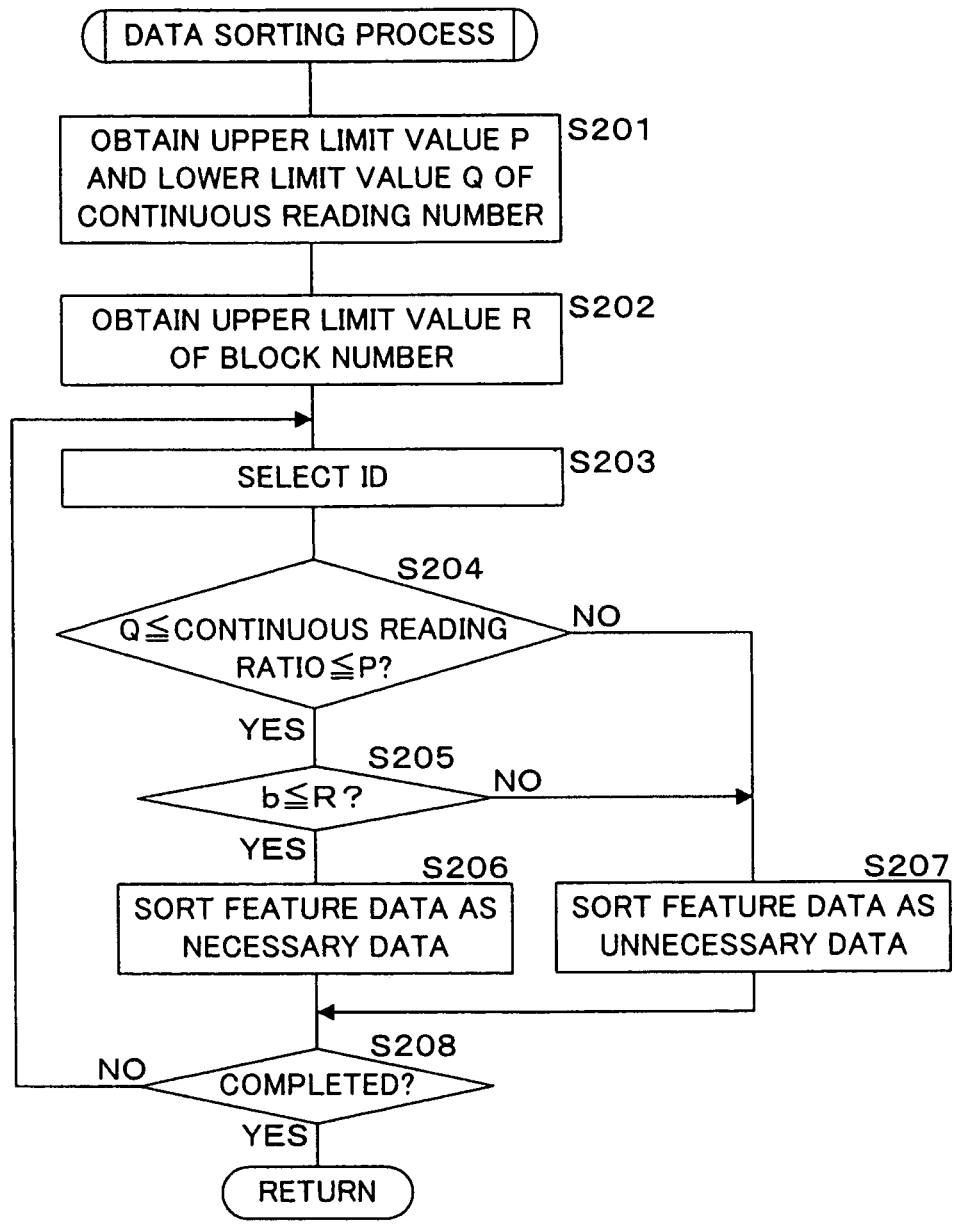
FIG. 10 is a flow chart for showing the process procedure of a data sorting process.

FIG. 10 is a flow chart for showing the process procedure of a data sorting process.

The control unit 10 obtains the upper limit value P and the lower limit value Q of the continuous reading number from the reference data 13*a* in the memory unit 13 (S201). Next, the control unit 10 obtains the upper limit value R of the block number from the reference data 13*a* (S202). The feature data 12*b* generated in S7 of FIG. 8 has been generated for each ID, and the control unit 10 selects an ID of feature data 12*b* to be sorted (S203). The control unit 10 then determines whether the continuous reading ratio included in feature data 12*b* according to a selected ID is larger than or equal to the lower limit value Q and smaller than or equal to the upper limit value P or not (S204).

When the continuous reading ratio is larger than or equal to the lower limit value Q and smaller than or equal to the upper limit value P (S204: YES), the control unit 10 determines whether the block number b included in the feature data 12*b* is smaller than or equal to the upper limit value R or not (S205). When the block number b is smaller than or equal to the upper limit value R (S205: YES), the control unit 10 sorts the feature data 12*b* as necessary data (S206). In such a manner, the control unit 10 can sort an IC tag 3, from which the reader/writer 2 has read the data, as a target tag. The control unit 10 then shifts the process to S208.

When the continuous reading ratio is smaller than the lower limit value Q or larger than the upper limit value P (S204: NO) and when the block number b is larger than the upper limit value R (S205: NO), the control unit 10 sorts the feature data 12*b* as unnecessary data (S207). In such a manner, the control unit 10 can sort an IC tag 3, from which the reader/writer 2 has read the data, as an unnecessary tag. The control unit 10 then shifts the process to S208.

The control unit 10 determines whether the process described above for all of generated feature data 12*b* has been completed or not (S208). When the process has not been completed (S208: NO), the control unit 10 selects another ID (S203) and executes the process after S204 for feature data 12*b* according to the selected ID. When the process has been completed (S208: YES), the control unit 10 terminates the present operation and returns to FIG. 8.

The control unit 20 determines whether an instruction command has been received from the administrative device 1 or not. When an instruction command has not been received, the control unit 20 waits until an instruction command is received. When an instruction command has been received, the control unit 20 performs a necessary operation according to the type of the instruction command.

The control unit 20 orders to transmit a radio signal according to the type of the instruction command. The control unit 20 then determines whether a response has been received from an IC tag 3 which received a radio signal or not. When a response has been received, the control unit 20 orders to transmit necessary data to the administrative device 1 according to the content of the received response. When the instruction command is a search instruction command, the ID of the IC tag 3 included in the response is transmitted to the administrative device 1. The control unit 20 then terminates the present operation.

When a response has not been received, the control unit 20 performs a necessary retry number of retransmission. When a response to retransmission is received, the control unit 20 orders to transmit necessary data to the administrative device 1 according to the content of the received response. When a response is not received after performing a necessary retry number of retransmission, the control unit 20 transmits error notification to the administrative device 1 and terminates the present operation.

As described above, the administrative device 1 according to Embodiment 1 sorts feature data 12*b* generated from read data 12*a*, which shows the result of reading in chronologic order, as necessary data or unnecessary data on the basis of the reference data 13*a*. By sorting the feature data 12*b*, an IC tag 3 is sorted as a target tag or an unnecessary tag. In such a manner, by sorting an IC tag 3 on the basis of not the content of read data but feature data 12*b* which indicates the feature of the result of reading, it is possible to sort an IC tag 3 easily without setting up a radio wave adsorption plate or the like.

The administrative device 1 according to Embodiment 1 also generates read data 12*a* as data which shows the result of reading in chronologic order and extracts the feature of the result of reading. The feature data 12*b* becomes substantially the same data regardless of data of an IC tag 3 since the reader/writer 2 is set up above the path 52. Accordingly, it becomes unnecessary to perform a process for determining whether the content of the read data of an IC tag 3 accords or not.

(Embodiment 2)

The following description will explain Embodiment 2 of a reading device in detail with reference to the drawings. It should be noted that the administrative device 1 according to Embodiment 2 is realized by the same structure as that of the administrative device 1 according to Embodiment 1 described above, and the same codes are used to refer to the same structure and explanation thereof will be omitted.

Figure 11:
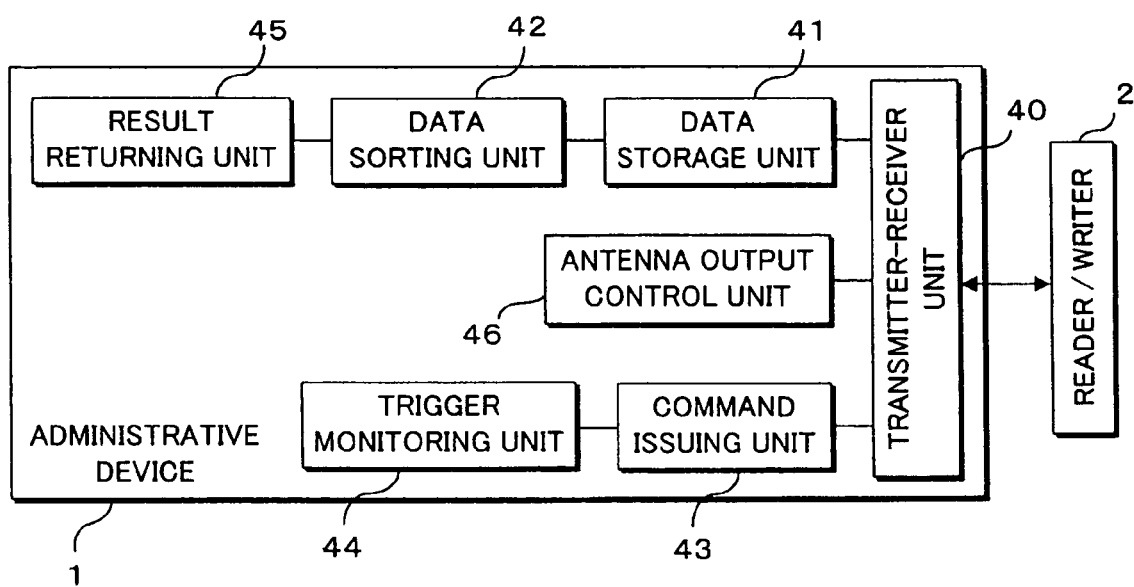
FIG. 11 is a block diagram for showing the function and the structure of an administrative device according to Embodiment 2.

FIG. 11 is a block diagram for showing the functional structure of an administrative device 1 according to Embodiment 2.

The administrative device 1 according to Embodiment 2 further includes an antenna output control unit 46 besides the function provided in the administrative device 1 according to Embodiment 1. The antenna output control unit 46 generates an antenna output control parameter for specifying the output level of a radio signal to be transmitted from the antenna 23*a* of the reader/writer 2. The transmitter-receiver unit 40 transmits the antenna output control parameter generated by the antenna output control unit 46 simultaneously while transmitting a command issued by the command issuing unit 43 to the reader/writer 2. The reader/writer 2 transmits a radio signal by antenna feeding (antenna power) on the basis of the received antenna output control parameter. The antenna output control unit 46 in Embodiment 2 can specify the power of antenna feeding (antenna power) from 10 [dBm] to 27 [dBm]. It should be noted that the reader/writer 2 may have the antenna output control function, although the administrative device 1 has the antenna output control unit in Embodiment 2.

Figure 12A:
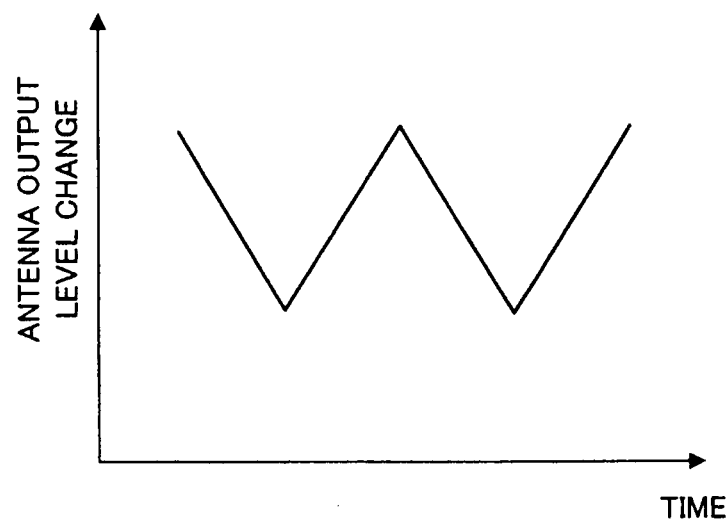
FIGS. 12A and 12B are views for showing a change in an antenna output level.
Figure 12B:
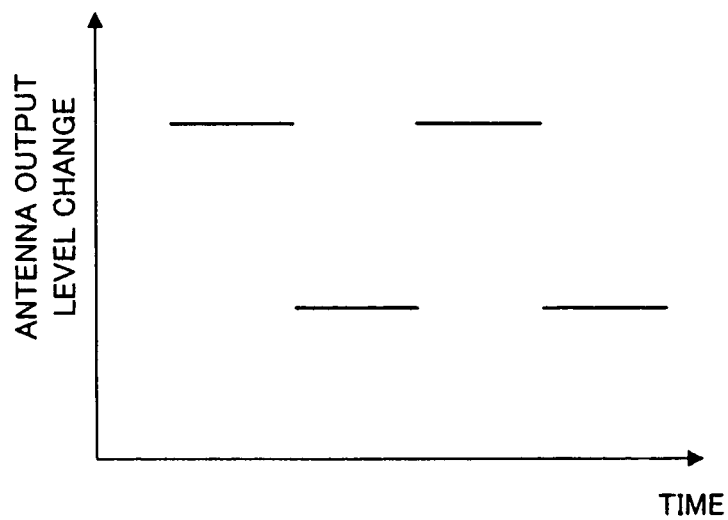

FIGS. 12A and 12B are views for showing a change in an antenna output level.

The antenna output control unit 46 generates an antenna output control parameter which changes as "27, 23, 20, 17, 14, 17, 20, 23" depending on a preset antenna output set value every time the command issuing unit 43 issues a command. In such a manner, the strength of the output level of a radio signal transmitted from the reader/writer 2 repeatedly changes as shown in FIG. 12A.

The antenna output control unit 46 also can generate an antenna output control parameter which repeats "27, 27, 27" and "14, 14, 14" alternately when different antenna output set values are set. In such a manner, the strength of the output level of a radio signal repeatedly changes as shown in FIG. 12B.

A difference in a read data 13a of an IC tag 3 which is a target of reading and an IC tag 3 which is not a target of reading may be small depending on the positional relation therebetween. In such a case, by changing the output level of a radio signal to be transmitted from the reader/writer 2 as described above, a difference in the result of reading can be emphasized.

FIG. 13 is a schematic view for showing read data obtained when the output level of a radio signal is changed.

As shown in FIG. 13, eight IDs can be detected by continuous issuance of read commands. In such a case, weakening of the output level due to a long distance from the reader/writer 2 makes it impossible for some IC tags 3 (e.g., ID4 and ID6) to make a response. As a result, the administrative device 1 can determine that the IC tags 3 of the ID4 and ID6 are not the target of reading.

It should be noted that there are a plurality of read blocks, which could be read continuously, in read data 12a when the output level is lowered. Accordingly, when the upper limit value of the block number is set to "1", it is possible to sort feature data 12b according to an ID, which becomes unreadable due to lowering of the output level, as unnecessary data even when an upper limit value and a lower limit value of the continuous reading ratio are not is set in the reference data 13a.

The following description will explain the operation of the administrative device 1 according to Embodiment 2.

Figure 14:
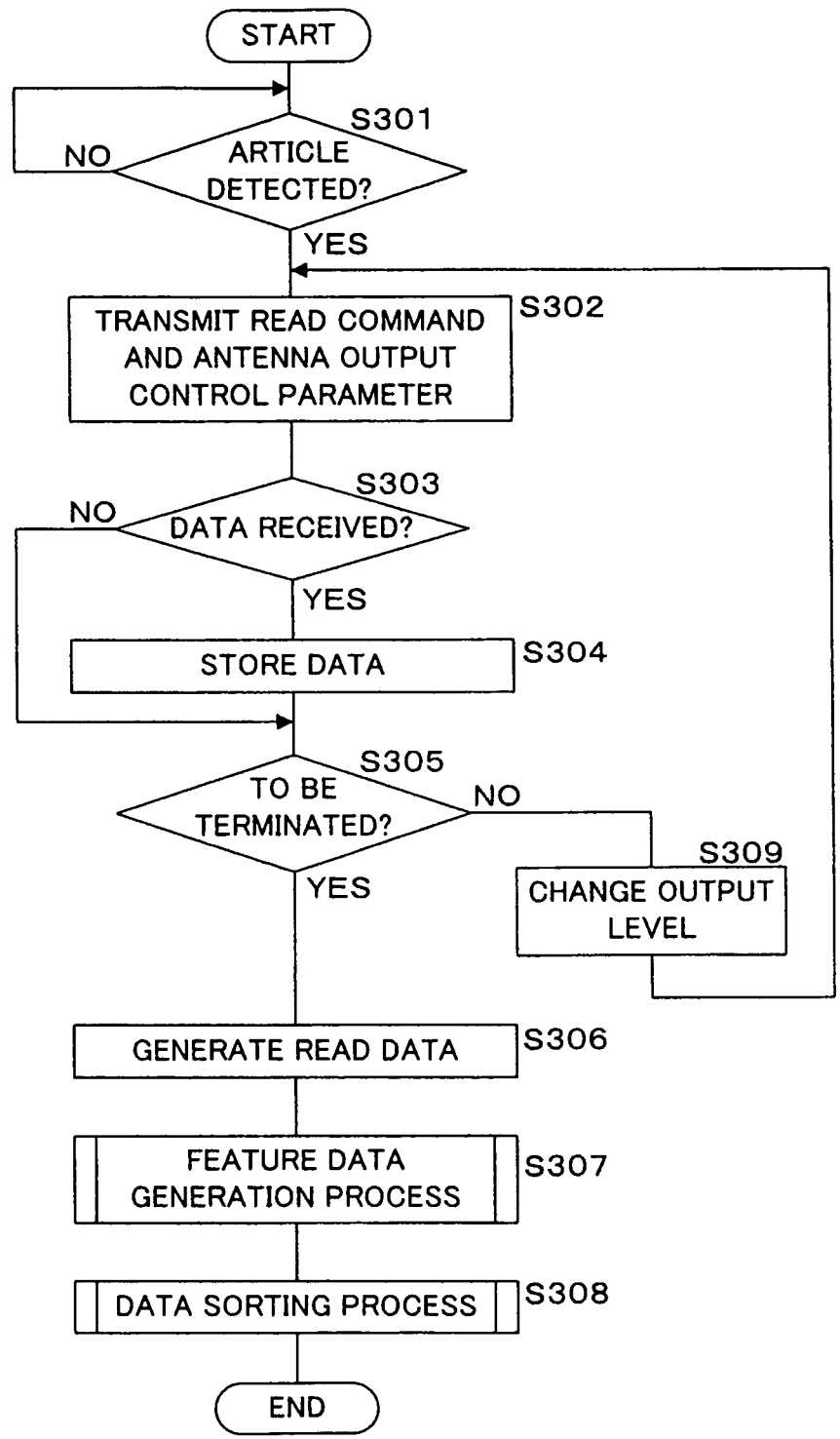
FIG. 14 is a flow chart for showing the process procedure to be performed by an administrative device 1.

FIG. 14 is a flow chart for showing the process procedure to be performed by the administrative device 1.

The control unit 10 determines whether the sensor 17 has detected an article 50 which passes under the reader/writer 2 or not (S301). When the sensor 17 has not detected an article 50 (S301: NO), the control unit 10 waits until an article is detected. When the sensor 17 has detected an article 50 (S301: YES), the control unit 10 issues a read instruction command, and an antenna output control parameter according to setting of the antenna output control unit 46 and transmits the issued read instruction command and antenna output control parameter to the reader/writer 2 (S302). It should be noted that the control unit 10 generates a preset default value of an antenna output control parameter and transmits the generated antenna output control parameter together with a read instruction command in S302 when there is no special specification.

The control unit 10 determines whether data of an IC tag 3 has been received from the reader/writer 2 or not (S303). When data has been received from the reader/writer 2 (S303: YES), the control unit 10 stores the received data in the memory unit 13 (S304). The control unit 10 then executes a process of S305. When data has not been received from the reader/writer 2 (S303: NO), the control unit 10 executes the process of S305.

Next, the control unit 10 determines whether the process is to be terminated or not, i.e., whether a reading process is to be continued or not (S305). The control unit 10 determines whether a predetermined time has elapsed after the sensor 17 detected an article 50 or not. When a termination sensor is further provided, whether the reading process is to be terminated or continued may also be determined on the basis of whether the termination sensor has detected an article 50 or not.

When the process is not to be terminated (S305: NO), the control unit 10 changes the output level of a radio signal to be transmitted from the reader/writer 2 (S309) and repeatedly executes the process after S302 until a predetermined time elapses. When a predetermined time elapses and the process is to be terminated (S305: YES), the control unit 10 generates read data from data stored in the memory unit 13 (S306). The control unit 10 executes a process for generating feature data 12b on the basis of the generated read data (S307). The control unit 10 executes a process for sorting data on the basis of the generated feature data 12b (S308). The control unit 10 then terminates the present operation. The feature data generation process of S307 and the data sorting process of S308 are the same as those of Embodiment 1.

As described above, it is possible to sort an IC tag 3 as a target tag or an unnecessary tag clearly by changing the strength of the output level of a radio signal to be transmitted from the reader/writer 2. For example, an IC tag 3 which is attached to an article placed in a position far from the reader/writer 2 can receive a radio signal when the output level of the radio signal is strong. The IC tag 3 sometimes cannot receive a radio signal when the output level of the radio signal is weakened. On the other hand, an IC tag 3 which is attached to an article that passes under the reader/writer 2 can receive a radio signal regardless of the output level of the radio signal. Accordingly, an IC tag 3 which shows an unstable result of reading is sorted as an unnecessary tag and an IC tag 3 which shows a stable result of reading is sorted as a target tag.

(Embodiment 3)

The following description will explain Embodiment 3 of a reading device in detail with reference to the drawings. It should be noted that the administrative device 1 according to Embodiment 3 is realized by the same structure as that of the administrative device 1 according to Embodiment 1 described above, and the same codes are used to refer to the same structure and explanation thereof will be omitted.

Figure 15:
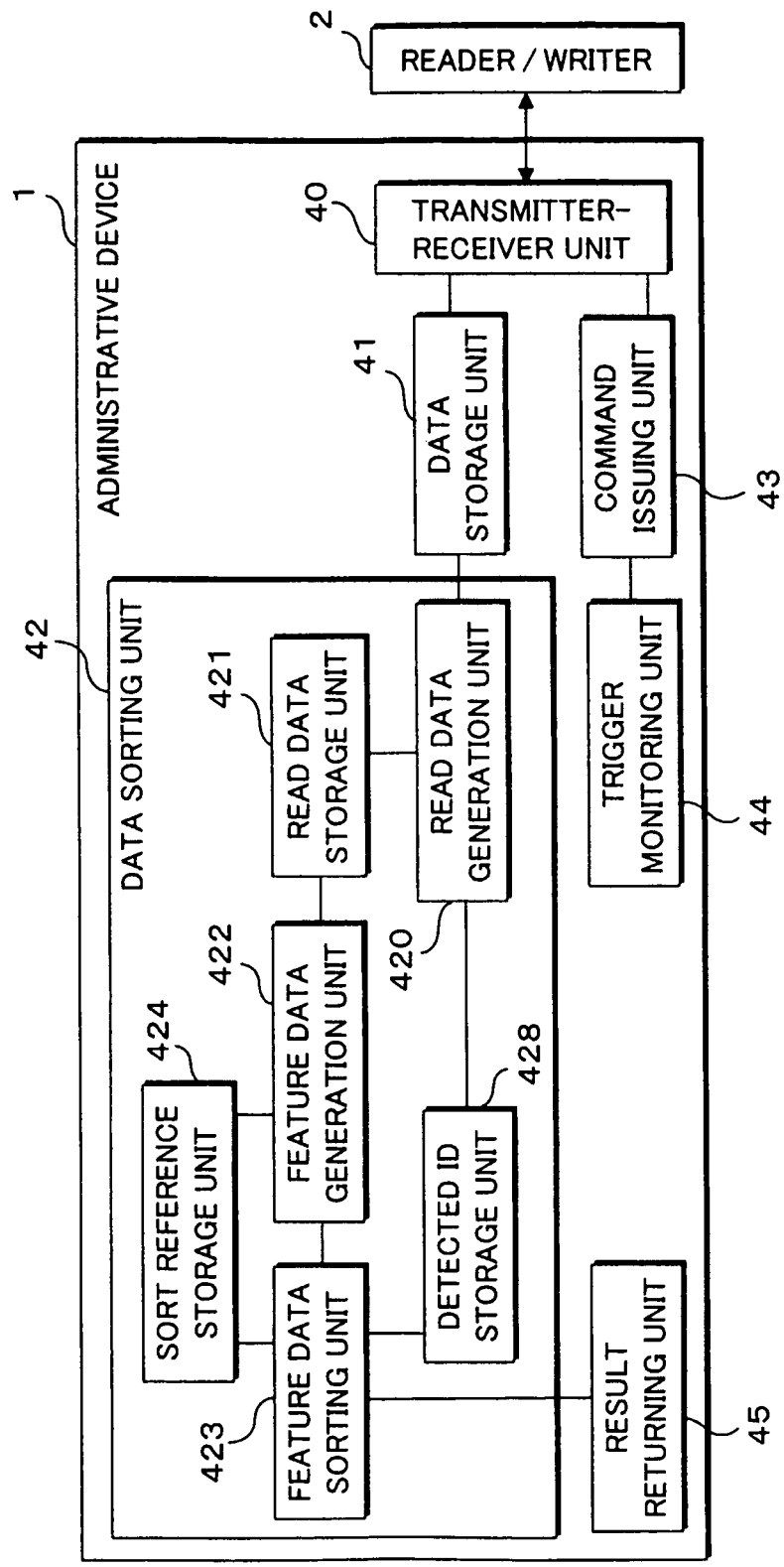
FIG. 15 is a block diagram for showing the function and the structure of an administrative device according to Embodiment 3.

FIG. 15 is a block diagram for showing the functional structure of an administrative device 1 according to Embodiment 3.

The administrative device 1 according to Embodiment 3 further includes a detected ID storage unit 428 and the like in the data sorting unit 42 besides the function provided in the administrative device 1 according to Embodiment 1.

The detected ID storage unit 428 stores the result of sorting by the feature data sorting unit 423. When the reader/writer 2 reads data of an IC tag 3 and the ID of the data is stored as an unnecessary tag in the detected ID storage unit 428, the read data generation unit 420 does not generate read data and the IC tag 3 is sorted as an unnecessary tag.

Figure 16:
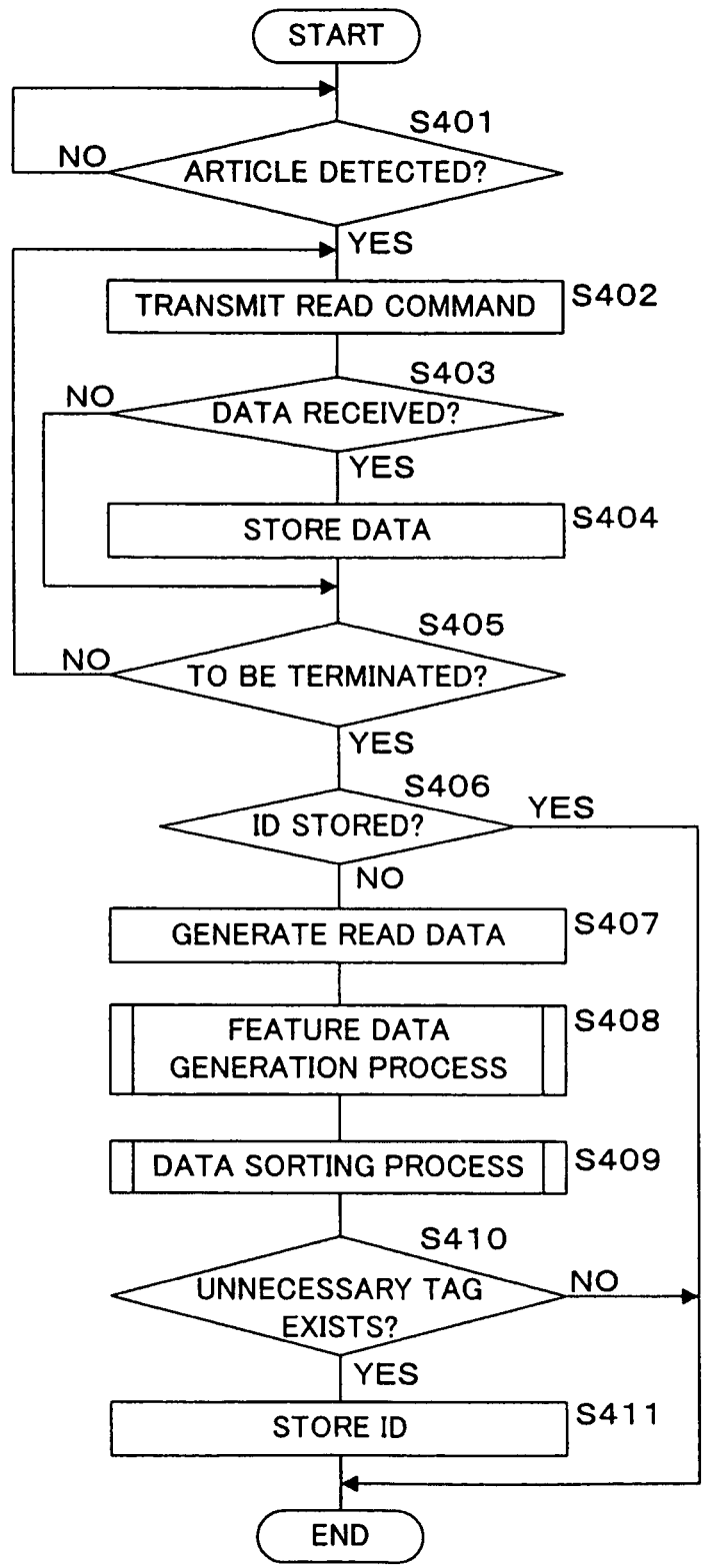
FIG. 16 is a flow chart for showing the process procedure to be performed by the administrative device according to Embodiment 3.

FIG. 16 is a flow chart for showing the process procedure to be performed by the administrative device 1 according to Embodiment 3.

The control unit 10 determines whether the sensor 17 has detected an article 50 which passes under the reader/writer 2 or not (S401). When the sensor 17 has not detected an article 50 (S401: NO), the control unit 10 waits until an article 50 is detected. When the sensor 17 has detected an article 50 (S401: YES), the control unit 10 issues a read instruction command and transmits the issued read instruction command to the reader/writer 2 (S402).

The control unit 10 determines whether data of an IC tag 3 has been received from the reader/writer 2 or not (S403). When data has been received from the reader/writer 2 (S403: YES), the control unit 10 stores the received data in the memory unit 13 (S404). The control unit 10 then executes a process of S405. When data has not been received from the reader/writer 2 (S403: NO), the control unit 10 executes the process of S405.

Next, the control unit 10 determines whether the process is to be terminated or not, i.e., whether a reading process is to be continued or not (S405). The control unit 10 determines whether a predetermined time has elapsed after the sensor 17 detected an article 50 or not. When a termination sensor is further provided, whether the reading process is to be terminated or continued may also be determined on the basis of whether the termination sensor has detected an article 50 or not.

When the process is not to be terminated (S405: NO), the control unit 10 repeatedly executes the process after S402 until a predetermined time elapses. When a predetermined time elapses and the process is to be terminated (S405: YES), the control unit 10 determines whether the ID of data of the IC tag 3 which has been received from the reader/writer 2 is stored in the memory unit 13 or not (S406). When the ID is stored (S406: YES), the control unit 10 determines that the IC tag 3 of the received data has already been sorted as an unnecessary tag and terminates the present operation.

When the ID is not stored (S406: NO), the control unit 10 generates read data from data stored in the memory unit 13 (S407). The control unit 10 executes a process for generating feature data 12b on the basis of the generated read data (S408). The control unit 10 executes a process for sorting data on the basis of the generated feature data 12b (S409). The feature data generation process of S408 and the data sorting process of S409 are the same as those of Embodiment 1.

The control unit 10 determines whether there is an IC tag 3 sorted as an unnecessary tag in S409 or not (S410). When there is an IC tag 3 sorted as an unnecessary tag (S410: YES), the control unit 10 stores the ID of said IC tag 3 in the memory unit 13 (S411). In such a manner, when the administrative device 1 receives data having the same ID subsequently, the IC tag 3 can be sorted as unnecessary data without executing the feature data generation process of S408, the data sorting process of S409 and the like. The control unit 10 then terminates the present operation. When there is not an IC tag 3 sorted as an unnecessary tag (S410: NO), the control unit 10 also terminates the present operation.

When an article is placed near the reader/writer 2, there is a high possibility that the reader/writer 2 receives data of an IC tag 3 of the placed article every time reading is executed. Accordingly, it is possible to reduce the burden of processing by sorting data of an IC tag 3, which has been sorted as an unnecessary tag once, as an unnecessary tag before generating read data and the like.

It should be noted that the function of the administrative device 1 and the reader/writer 2 may be executed by one device, although an administrative device 1 and a reader/writer 2 are separately provided in the above Embodiments 1 to 3. Moreover, the reader/writer 2 may be a portable type.

A program according to the present embodiment can be stored in a DVD-ROM, a CD-ROM, an FD (flexible disk) or another arbitrary computer program product 11A as shown in FIG. 2. Furthermore, a program can be downloaded from another server computer, which is not illustrated, via a network 4. The following description will explain the content thereof. The computer program product 11A which stores a program according to the present embodiment is inserted into a computer program product reading device, which is not illustrated, of the administrative device 1 shown in FIG. 2. The program is installed into the ROM 11. Alternatively, the program may be downloaded from another external server computer, which is not illustrated, via a network 4. The control unit 10 installs the program into the ROM 11. In such a manner, the administrative device 1 obtains the function described above.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reading device for repeatedly reading data, which is stored in a recording medium existing in an area where communication between the recording medium and the reading device can be established, in a noncontact method, comprising:
   a first generation unit for generating time series data which shows a result of reading in chronologic order;
   a second generation unit for generating feature data indicative of a feature of the result of reading based on the time series data generated by the first generation unit;
   a first sorting unit for sorting read data as necessary data or unnecessary data based on the feature data generated by the second generation unit,
   wherein the second generation unit extracts continuous reading numbers of successful continuous reading in chronologic order per recording medium, extracts a maximum continuous reading number from the extracted continuous reading numbers, and generates a continuous reading ratio by dividing the continuous reading numbers per recording medium according to the maximum continuous reading number, and
   the first sorting unit sorts the data read from the recording medium as necessary data when the continuous reading ratio is within a range of threshold, and sorts the data read from the recording medium as unnecessary data when the continuous reading ratio is less than the threshold.

2. The reading device according to claim 1, further comprising a control unit for changing strength of an output level of the request signal.

3. The reading device according to claim 1, further comprising:
   an obtaining unit for obtaining identification data, which is included in read data, for identifying a recording medium storing said data;
   a storage unit for storing identification data of data which has been sorted as unnecessary data by the first sorting unit;
   a determination unit for determining whether identification data obtained by the obtaining unit in reading data is stored in the storage unit or not; and
   a second sorting unit for sorting read data as unnecessary data when the determining unit has determined that the identification data is stored in the storage unit.

4. A reading device for repeatedly reading data, which is stored in a recording medium existing in an area where communication between the recording medium and the reading device can be established, in a noncontact method, comprising:
   first generation means for generating time series data which shows a result of reading in chronologic order;
   second generation means for generating feature data indicative of a feature of the result of reading based on the time series data generated by the first generation means; and first sorting means for sorting read data as necessary data or unnecessary data based on the feature data generated by the second generation means;

wherein the second generation means extracts continuous reading numbers of successful continuous reading in chronologic order per recording medium, extracts a maximum continuous reading number from the extracted continuous reading numbers, and generates a continuous reading ratio by dividing the continuous reading numbers per recording medium according to the maximum continuous reading number, and the first sorting means sorts the data read from the recording medium as necessary data when the continuous reading ratio is within a range of threshold, and sorts the data read from the recording medium as unnecessary data when the continuous reading ratio is less than the threshold.

5. The reading device according to claim 4, further comprising control means for changing strength of an output level of the request signal.

6. The reading device according to claim 4, further comprising:
- obtaining means for obtaining identification data, which is included in read data, for identifying a recording medium storing said data;
- storage means for storing identification data of data which has been sorted as unnecessary data by the first sorting means;
- determination means for determining whether identification data obtained by the obtaining means in reading data is stored in the storage means or not; and
- second sorting means for sorting read data as unnecessary data when the determining means has determined that the identification data is stored in the storage means.

7. A non-transitory computer program product for causing a computer to repeatedly read data, which is stored in a recording medium existing in an area where communication between the recording medium and the computer can be established, in a noncontact method, comprising:
- a first generation step of generating time series data which shows a result of reading in chronologic order;
- a second generation step of generating feature data indicative of a feature of the result of reading based on the time series data generated in the first generation step; and
- a first sorting step of sorting read data as necessary data or unnecessary data based on the feature data generated in the second generation step;

wherein the second generation step extracts continuous reading numbers of successful continuous reading in chronologic order per recording medium, extracts a maximum continuous reading number from the extracted continuous reading numbers, and generates a continuous reading ratio by dividing the continuous reading numbers per recording medium according to the maximum continuous reading number, and the first sorting step sorts the data read from the recording medium as necessary data when the continuous reading ratio is within a range of threshold, and sorts the data read from the recording medium as unnecessary data when the continuous reading ratio is less than the threshold.

8. The computer program product according to claim 7, further comprising a control step of changing strength of an output level of the request signal.

9. The computer program product according to claim 7, further comprising:
- a storage control step of causing storage means to store identification data for identifying a recording medium storing data which is sorted as unnecessary data in the first sorting step;
- a determination step of determining whether identification data for identifying a recording medium storing data is stored in the storing means or not when said data is read; and
- a second sorting step of sorting read data as unnecessary data when it is determined in the determination step that the identification data is stored in the storage means.

10. A reading system for repeatedly reading data, which is stored in a recording medium existing in an area where communication between the recording medium and the reading system can be established, in a noncontact method, comprising:
- a first generation unit for generating time series data which shows a result of reading in chronologic order;
- a second generation unit for generating feature data indicative of a feature of the result of reading based on the time series data generated by the first generation unit; and
- a first sorting unit for sorting read data as necessary data or unnecessary data based on the feature data generated by the second generation unit, wherein the second generation unit extracts continuous reading numbers of successful continuous reading in chronologic order per recording medium, extracts a maximum continuous reading number from the extracted continuous reading numbers, and generates a continuous reading ratio by dividing the continuous reading numbers per recording medium according to the maximum continuous reading number, and the first sorting unit sorts the data read from the recording medium as necessary data when the continuous reading ratio is within a range of threshold, and sorts the data read from the recording medium as unnecessary data when the continuous reading ratio is less than the threshold.

* * * * *